US012109710B2

(12) United States Patent
Li et al.

(10) Patent No.: US 12,109,710 B2
(45) Date of Patent: Oct. 8, 2024

(54) METHOD AND APPARATUS FOR MOTION PLANNING OF ROBOT, METHOD AND APPARATUS FOR PATH PLANNING OF ROBOT, AND METHOD AND APPARATUS FOR GRASPING OF ROBOT

(71) Applicant: MECH-MIND ROBOTICS TECHNOLOGIES LTD., Beijing (CN)

(72) Inventors: Xi Li, Beijing (CN); Xinv Zhu, Beijing (CN); Youshuang Ding, Beijing (CN); Tianlan Shao, Beijing (CN); Wenjie Duan, Beijing (CN); Bing Liu, Beijing (CN); Zheng Wang, Beijing (CN)

(73) Assignee: MECH-MIND ROBOTICS TECHNOLOGIES LTD., Beijing (CN)

( * ) Notice: Subject to any disclaimer, the term of this patent is extended or adjusted under 35 U.S.C. 154(b) by 286 days.

(21) Appl. No.: 17/574,798

(22) Filed: Jan. 13, 2022

(65) Prior Publication Data
US 2022/0134559 A1 May 5, 2022

Related U.S. Application Data

(63) Continuation of application No. PCT/CN2020/122219, filed on Oct. 20, 2020.

(30) Foreign Application Priority Data

May 22, 2020 (CN) .......................... 202010440673.4

(51) Int. Cl.
*B25J 9/16* (2006.01)
*B25J 15/06* (2006.01)
(52) U.S. Cl.
CPC .......... *B25J 9/1666* (2013.01); *B25J 9/1669* (2013.01); *B25J 15/0683* (2013.01)

(58) Field of Classification Search
CPC .... B25J 9/1666; B25J 9/1669; B25J 15/0683; B25J 9/1612; B25J 15/0616; B25J 9/1653;
(Continued)

(56) References Cited

U.S. PATENT DOCUMENTS 6,212,444 B1   4/2001   Kato et al.
10,456,915 B1  10/2019  Diankov
(Continued)

FOREIGN PATENT DOCUMENTS

CN   101512453 A    8/2009
CN   102773858 A   11/2012
(Continued)

OTHER PUBLICATIONS

Notice of Reasons for Refusal dated Mar. 28, 2023 received in Japanese Patent Application No. JP 2022-506756.
(Continued)

*Primary Examiner* — Abby Y Lin
*Assistant Examiner* — Dylan M Katz
(74) *Attorney, Agent, or Firm* — Scully, Scott, Murphy & Presser, P.C.

(57) ABSTRACT

The present disclosure discloses a method and apparatus for motion planning of a robot, a method and apparatus for path planning of a robot, and a method and apparatus for grasping of a robot. The method includes: when the robot operates on an object to be operated, performing, in combination with a space model of a real scene where the object is located, collision detection on the object and a collision subject in the space model; and determining a motion planning scheme for the robot corresponding to a result of the collision detection based on collision sensitivity of the object and collision sensitivity of the collision subject, the motion planning scheme being formed by the robot operating on the object.

8 Claims, 8 Drawing Sheets

(58) Field of Classification Search
CPC ........ B25J 15/12; B25J 9/163; B25J 15/0009; B25J 9/1633; B25J 13/084; G05B 2219/39536; G05B 2219/40442; G05B 2219/40053; G05B 2219/39528; G05B 2219/39532; G05B 2219/39571; G01C 21/20; G01C 21/34
See application file for complete search history.

(56) References Cited

U.S. PATENT DOCUMENTS

| | | | | |
|---|---|---|---|---|
| 2015/0328776 | A1* | 11/2015 | Shiratsuchi | B25J 9/1676 901/49 |
| 2017/0357242 | A1* | 12/2017 | Watanabe | B25J 9/1666 |
| 2019/0054620 | A1 | 2/2019 | Griffiths et al. | |
| 2019/0061750 | A1* | 2/2019 | Tamura | B60W 30/0956 |
| 2019/0299409 | A1* | 10/2019 | Hazan | B25J 9/1666 |
| 2020/0078939 | A1 | 3/2020 | Jeong et al. | |
| 2020/0174481 | A1* | 6/2020 | Van Heukelom | G06N 3/045 |
| 2021/0016439 | A1* | 1/2021 | Kozuka | B25J 9/1697 |
| 2021/0138649 | A1* | 5/2021 | Baer | B25J 9/1666 |
| 2021/0178591 | A1* | 6/2021 | Floyd-Jones | B25J 9/1671 |

FOREIGN PATENT DOCUMENTS

| | | |
|---|---|---|
| CN | 104850699 A | 8/2015 |
| CN | 105598965 A | 5/2016 |
| CN | 105945942 A | 9/2016 |
| CN | 106166749 A | 11/2016 |
| CN | 106166750 A | 11/2016 |
| CN | 106695802 A | 5/2017 |
| CN | 107253180 A | 10/2017 |
| CN | 107803831 A | 3/2018 |
| CN | 108196453 A | 6/2018 |
| CN | 109311604 A | 2/2019 |
| CN | 109816730 A | 5/2019 |
| CN | 109986560 A | 7/2019 |
| CN | 110340890 A | 10/2019 |
| CN | 110411446 A | 11/2019 |
| CN | 111015655 A | 4/2020 |
| CN | 111504328 A | 8/2020 |
| DE | 102013019450 A1 | 5/2015 |
| EP | 3385038 A1 | 10/2018 |
| JP | 2013504447 A | 2/2013 |
| JP | 6704157 B1 | 6/2020 |
| WO | 2016122840 A1 | 8/2016 |
| WO | 2018193130 A1 | 10/2018 |
| WO | 2019215998 A1 | 11/2019 |
| WO | 2020040979 A1 | 2/2020 |

OTHER PUBLICATIONS

Second Office Action dated Feb. 25, 2022 received in Chinese Patent Application No. CN 202010440673.4 together with an English language translation.
International Search Report dated Feb. 26, 2021 issued in PCT/CN2020/122219.
Chinese First Office Action dated Jul. 13, 2021 issued in CN 202010440673.4.
Notification to Grant Patent Right for Invention dated Jun. 10, 2022 received in Chinese Patent Application No. CN 202010440673.4.
Notice of Reasons for Refusal dated Jul. 25, 2023 received in Japanese Patent Application No. JP 2022-506756.
First Office Action dated Jun. 29, 2023 received in Chinese Patent Application No. CN 202110866359.7.
Aolei, Y. et al., "Dynamic multi-target 3D grasp posture detection approach based on deep convolutional network", Chinese Journal of Scientific Instrument, Dec. 2019, pp. 135-142, vol. 40, No. 12, with English language abstract.
Written Decision on Registration dated Jul. 28, 2024 received in Korean Patent Application No. KR 10-2022-7003435.

* cited by examiner

When the robot completes a grasping operation on an object, performing moving path planning on the robot based on the collision degree detection, discretizing a moving path corresponding to a result of the moving path planning, and transmitting discretized trajectory points obtained by the discretizing for the robot to move — 301

Determining a moving time point of the robot corresponding to each of the discretized trajectory points based on a moving speed of the robot, and performing collision detection on the object at the moving time point — 302

Stopping moving of the robot at a time point when a collision degree is higher than a collision sensitivity of the object, to prevent an occurrence of danger — 303

FIG. 3

Calculating, based on a clamping device at an operation terminal of the robot and an object to be grasped, all grasping poses of the robot for grasping the object — 401

Determining, based on a first symmetry degree of the object and a second symmetry degree of a set of contact points between the clamping device and the object, a target pose with a minimum degree of transformation relative to a current pose of the robot from the grasping poses — 402

Performing the collision degree detection on the clamping device to determine a moving path from the current pose to the target pose, and transmitting to the robot trajectory points obtained by discretizing the moving path to complete a grasping operation — 403

FIG. 4a

METHOD AND APPARATUS FOR MOTION PLANNING OF ROBOT, METHOD AND APPARATUS FOR PATH PLANNING OF ROBOT, AND METHOD AND APPARATUS FOR GRASPING OF ROBOT

CROSS-REFERENCE TO RELATED APPLICATION

This application is a continuation of International Application NO. PCT/CN2020/122219, filed on Oct. 20, 2020, which claims priority to Chinese Patent Application No. 202010440673.4, titled "METHOD AND APPARATUS FOR MOTION PLANNING OF ROBOT, METHOD AND APPARATUS FOR PATH PLANNING OF ROBOT, AND METHOD AND APPARATUS FOR GRASPING OF ROBOT", and filed on May 22, 2020, the entire disclosures of which are incorporated herein by their references.

TECHNICAL FIELD

The present disclosure relates to the field of computer technologies, and more particularly, to a method and apparatus for motion planning of a robot, a method and apparatus for path planning of a robot, and a method and apparatus for grasping of a robot.

BACKGROUND

With the development of industrial intellectualization, performing operations (such as grasping, moving, placing, etc.) on objects (such as industrial parts, industrial boxes, etc.) by using a robot rather than a human person has become increasingly popular. During an operation of the robot, it is generally necessary to transform a state of an object into another state, a process of which should avoid collisions between the object grasped by the robot and other objects, and make the robot move efficiently and smoothly, thereby avoiding dangers.

In the related art, real-time collision detection is carried out by using sensors mounted on an arm of a physical robot. However, this method is likely to cause motions of the robot to stutter, which affects the realization of industrial automation.

SUMMARY

An objective of the present disclosure is to solve at least one of the aforementioned technical problems to a certain extent.

To this end, a first objective of the present disclosure is to provide a method for motion planning of a robot.

A second objective of the present disclosure is to provide a method for path planning of a robot based on collision degree detection.

A third objective of the present disclosure is to provide a method for grasping of a robot based on collision degree detection.

A fourth objective of the present disclosure is to provide an apparatus for motion planning of a robot.

A fifth objective of the present disclosure is to provide an apparatus for path planning of a robot based on collision degree detection.

A sixth objective of the present disclosure is to provide an apparatus for grasping of a robot based on collision degree detection.

A seventh objective of the present disclosure is to provide an electronic device.

An eighth objective of the present disclosure is to provide a computer-readable storage medium.

For the above objectives, embodiments in a first aspect of the present disclosure provide a method for motion planning of a robot. The method is characterized in performing collision degree detection on an object. The method includes: loading a space model of a real scene where the object is located; performing collision detection on the object and each of at least one collision subject in the space model; and determining a motion planning scheme for the robot corresponding to a result of the collision detection based on a collision sensitivity of the object and a collision sensitivity of each of the at least one collision subject, the motion planning scheme being formed by the robot operating on the object.

In an embodiment of the present disclosure, said performing the collision detection on the object and each of the at least one collision subject in the space model includes: determining a degree of overlap between a collision model of the object and an object model of the collision subject; and determining a collision degree of the collision subject based on the degree of overlap and resolutions of the collision model and the subject model in the space model.

In an embodiment of the present disclosure, the collision model includes a set of small cubes formed by dividing a space occupied by the object at a first resolution in the space model, and the subject model includes a set of small cubes formed by dividing a space occupied by the collision subject at a second resolution in the space model.

In an embodiment of the present disclosure, said determining the collision degree of the collision subject based on the degree of overlap and the resolutions of the collision model and the subject model in the space model includes: determining a set of overlapping cubes between the collision model and the subject model; and determining a depth weight of each small cube in the set of overlapping cubes based on distances between the small cube and corresponding surfaces of the models, and determining a collision degree between the collision model and the subject model based on the depth weight and the degree of overlap, wherein the degree of overlap is a number of small cubes in the set of overlapping cubes.

In an embodiment of the present disclosure, the at least one collision subject includes a plurality of subjects overlapping a space occupied by the object on respective moving paths, after the robot completes a grasping operation on the object and before a placement operation on the object, in the motion planning scheme; and/or the at least one collision subject includes a clamping device at an operation terminal of the robot during the grasping operation on the object; and/or the at least one collision subject includes a contact object with which the object is in contact when being placed by the robot during the placement operation.

With the method for the motion planning of the robot according to the embodiments of the present disclosure, when the robot operates on the object to be operated, the collision detection is performed, in combination with the space model of the real scene where the object is located, on the object and the collision subject in the space model; and the motion planning scheme for the robot corresponding to the result of the collision detection is determined based on the collision sensitivity of the object and the collision sensitivity of the collision subject, the motion planning scheme being formed by the robot operating on the object, such that the robot can move based on the motion planning scheme when operating the object, thereby avoiding motion stuttering in a robot motion process when the robot operates on the object, smoothing robot motions, and improving intellectualization of industrial operations of the robot.

For the above objectives, embodiments in a second aspect of the present disclosure provide a method for path planning of a robot based on collision degree detection. The method includes: when the robot completes a grasping operation on an object, performing moving path planning on the robot based on the collision degree detection, discretizing a moving path corresponding to a result of the moving path planning, and transmitting discretized trajectory points obtained by the discretizing for the robot to move; determining a moving time point of the robot corresponding to each of the discretized trajectory points based on a moving speed of the robot, and performing collision detection on the object at the moving time point; and stopping moving of the robot at a time point when a collision degree is higher than a collision sensitivity of the object, to prevent an occurrence of danger.

In an embodiment of the present disclosure, said performing the collision detection on the object at the moving time point includes: performing the collision detection, at the moving time point, on the object and a collision subject in a space model of a real scene where the object is located, wherein the space model corresponds to a situation of the real scene at the moving time point; and the method further comprises: stopping moving of the robot at a time point when the collision degree is higher than a collision sensitivity of the collision subject, to prevent an occurrence of danger.

With the method for the path planning of the robot based on the collision degree detection according to the embodiments of the present disclosure, when the robot completes the grasping operation on the object, the moving path planning is performed on the robot based on the collision degree detection, the moving path corresponding to the result of the moving path planning is discretized, and the discretized trajectory points obtained by the discretizing are transmitted for the robot to move; the moving time point of the robot corresponding to each of the discretized trajectory points is determined based on the moving speed of the robot, and the collision detection is performed on the object at the moving time point; and the robot is stopped from moving at a time point when the collision degree is higher than the collision sensitivity of the object to prevent the occurrence of danger.

Consequently, in a case where smooth motions of the robot are ensured, the collision detection is performed on the object at respective moving time points of the robot based on the collision degree detection, and when it is determined that the collision degree corresponding to a certain moving time point is higher than the collision sensitivity of the object, the robot is controlled to stop moving, such that the operation safety of the robot is ensured, and intactness of the operated object is protected, thereby further improving the intellectualization of the robot while ensuring smooth motions of the robot.

For the above objectives, embodiments in a third aspect of the present disclosure provide a method for grasping of a robot based on collision degree detection. The method includes: calculating, based on a clamping device at an operation terminal of the robot and an object to be grasped, all grasping poses of the robot for grasping the object; determining, based on a first symmetry degree of the object and a second symmetry degree of a set of contact points between the clamping device and the object, a target pose with a minimum degree of transformation relative to a current pose of the robot from the grasping poses; and performing the collision degree detection on the clamping device to determine a moving path from the current pose to the target pose, and transmitting to the robot trajectory points obtained by discretizing the moving path to complete a grasping operation.

In an embodiment of the present disclosure, the first symmetry degree and the second symmetry degree are each an angle value; the object, after rotating by an angle value corresponding to the first symmetry degree, coincides with the object before the rotating; and the set of contact points, after rotating by an angle value corresponding to the second symmetry degree, coincides with the set of contact points before the rotating.

In an embodiment of the present disclosure, the clamping device includes a suction cup, the object includes a box body, and when the suction cup has an area different from that of a grasped surface of the box body, said calculating, based on the clamping device at the operation terminal of the robot and the object to be grasped, all grasping poses of the robot for grasping the object includes: determining a suction region on the grasped surface by aligning a center of the suction cup with a center of the grasped surface, or by aligning a vertex angle of the suction cup with a vertex angle of the grasped surface, or by aligning a long side of the suction cup with a long side of the grasped surface, or by aligning a short side of the suction cup with a short side of the grasped surface; and calculating said all grasping poses of the robot based on the determined suction region, wherein the suction region includes an orthographic projection point of a center of mass of the box body on the grasped surface.

In an embodiment of the present disclosure, the target pose includes a position and a posture of the clamping device, the posture includes a grasping orientation at which the clamping device faces the object, and the method further includes, subsequent to said determining the target pose with the minimum degree of transformation relative to the current pose of the robot from the grasping poses, adjusting the grasping orientation based on a deformability of the clamping device to reduce a difference between the grasping orientation and a current orientation of the clamping device.

With the method for the grasping of the robot based on the collision degree detection according to the embodiments of the present disclosure, when the robot grasps the object to be grasped, all the grasping poses of the robot for grasping the object are calculated based on the clamping device at the operation terminal of the robot and the object to be grasped; the target pose with the minimum degree of transformation relative to the current pose of the robot is determined from all the grasping poses based on the first symmetry degree of the object and the second symmetry degree of the set of contact points between the clamping device and the object, and the collision degree detection is performed on the clamping device to determine the moving path from the current pose to the target pose, and the trajectory points obtained by discretizing the moving path are transmitted to the robot to complete the grasping operation. Consequently, a grasping path of the robot is planned based on the collision degree detection, such that the robot can smoothly grasp the object based on the obtained grasping path while avoiding collisions, thereby further improving the intellectualization of the robot.

For the above objectives, embodiments in a fourth aspect of the present disclosure provide an apparatus for motion planning of a robot. The apparatus is characterized in performing collision degree detection on an object. The apparatus includes: a loading module configured to load a space model of a real scene where the object is located; a first collision detection module configured to perform collision detection on the object and at least one collision subject in the space model; and a first determining module configured to determine a motion planning scheme for the robot corresponding to a result of the collision detection based on a collision sensitivity of the object and a collision sensitivity of each of the collision subject, the motion planning scheme being formed by the robot operating on the object.

In an embodiment of the present disclosure, the first collision detection module includes: a first determining unit configured to determine a degree of overlap between a collision model of the object and a subject model of the collision subject; and a second determining unit configured to determine a collision degree of the collision subject based on the degree of overlap and resolutions of collision model and the subject model in the space model.

In an embodiment of the present disclosure, the collision model includes a set of small cubes formed by dividing a space occupied by the object at a first resolution in the space model, and the subject model includes a set of small cubes formed by dividing a space occupied by the collision subject at a second resolution in the space model.

In an embodiment of the present disclosure, the second determining unit includes: a first determining subunit configured to determine a set of overlapping cubes between the collision model and the subject model; and a second determining subunit configured to determine a depth weight of each small cube in the set of overlapping cubes based on distances between the small cube and corresponding surfaces of the models, and determine a collision degree between the collision model and the subject model based on the depth weight and the degree of overlap, wherein the degree of overlap is a number of small cubes in the set of overlapping cubes.

In an embodiment of the present disclosure, the at least one collision subject includes a plurality of subjects overlapping a space occupied by the object on respective moving paths, after the robot completes a grasping operation on the object and before a placement operation on the object, in the motion planning scheme; and/or the at least one collision subject includes a clamping device at an operation terminal of the robot during the grasping operation on the object; and/or the at least one collision subject includes a contact object with which the object is in contact when being placed by the robot during the placement operation.

With the apparatus for the motion planning of the robot according to the embodiments of the present disclosure, when the robot operates on the object to be operated, the collision detection is performed, in combination with the space model of the real scene where the object is located, on the object and the collision subject in the space model; and the motion planning scheme for the robot corresponding to the result of the collision detection is determined based on the collision sensitivity of the object and the collision sensitivity of the collision subject, the motion planning scheme being formed by the robot operating on the object, such that the robot can move based on the motion planning scheme when operating the object, thereby avoiding motion stuttering in a robot motion process when the robot operates on the object, smoothing robot motions, and improving intellectualization of industrial operations of the robot.

For the above objectives, embodiments in a fifth aspect of the present disclosure provide an apparatus for path planning of a robot based on collision degree detection. The apparatus includes: a first control module configured to: when the robot completes a grasping operation on an object, perform moving path planning on the robot based on the collision degree detection, discretize a moving path corresponding to a result of the moving path planning, and transmit discretized trajectory points obtained by the discretizing for the robot to move; a second collision detection module configured to determine a moving time point of the robot corresponding to each of the discretized trajectory points based on a moving speed of the robot, and perform collision detection on the object at the moving time point; and a second control module configured to stop moving of the robot at a time point when a collision degree is higher than a collision sensitivity of the object, to prevent an occurrence of danger.

In an embodiment of the present disclosure, the second collision detection module is specifically configured to perform the collision detection, at the moving time point, on the object and a collision subject in a space model of a real scene where the object is located, wherein the space model corresponds to a situation of the real scene at the moving time point, and the second control module is specifically configured to stop moving of the robot at the time point when the collision degree is higher than the collision sensitivity of the object or a collision sensitivity of the collision subject.

With the apparatus for the path planning of the robot based on the collision degree detection according to the embodiments of the present disclosure, when the robot completes the grasping operation on the object, the moving path planning is performed on the robot based on the collision degree detection, the moving path corresponding to the result of the moving path planning is discretized, and the discretized trajectory points obtained by the discretizing are transmitted for the robot to move; the moving time point of the robot corresponding to each of the discretized trajectory points is determined based on the moving speed of the robot, and the collision detection is performed on the object at the moving time point; and the robot is stopped from moving at the time point when the collision degree is higher than the collision sensitivity of the object, to prevent the occurrence of danger. Consequently, in a case where smooth motions of the robot are ensured, the collision detection is performed on the object at respective moving time points of the robot based on the collision degree detection, and when it is determined that the collision degree corresponding to a certain moving time point is higher than the collision sensitivity of the object, the robot is controlled to stop moving, such that the operation safety of the robot is ensured, and intactness of the operated object is protected, thereby further improving the intellectualization of the robot while ensuring smooth motions of the robot.

For the above objectives, embodiments in a sixth aspect of the present disclosure provide an apparatus for grasping of a robot based on collision degree detection. The apparatus includes: a calculation module configured to calculate, based on a clamping device at an operation terminal of the robot and an object to be grasped, all grasping poses of the robot for grasping the object; a second determining module configured to determine, based on a first symmetry degree of the object and a second symmetry degree of a set of contact points between the clamping device and the object, a target pose with a minimum degree of transformation relative to a current pose of the robot from the grasping poses; and a third control module configured to perform the collision degree detection on the clamping device to determine a moving path from the current pose to the target pose, and transmit to the robot trajectory points obtained by discretizing the moving path to complete a grasping operation.

In an embodiment of the present disclosure, the first symmetry degree and the second symmetry degree are each an angle value; the object, after rotating by an angle value corresponding to the first symmetry degree, coincides with the object before the rotating, and the set of contact points, after rotating by an angle value corresponding to the second symmetry degree, coincides with the set of contact points before the rotating.

In an embodiment of the present disclosure, the clamping device includes a suction cup, the object includes a box body, and when the suction cup has an area different from that of a grasped surface of the box body, the calculation module is specifically configured to: determine a suction region on the grasped surface by aligning a center of the suction cup with a center of the grasped surface, or by aligning a vertex angle of the suction cup with a vertex angle of the grasped surface, or by aligning a long side of the suction cup with a long side of the grasped surface, or by aligning a short side of the suction cup with a short side of the grasped surface; and calculate said all grasping poses of the robot based on the determined suction region, wherein the suction region includes an orthographic projection point of a center of mass of the box body on the grasped surface.

In an embodiment of the present disclosure, the target pose includes a position and a posture of the clamping device, the posture includes a grasping orientation at which the clamping device faces the object, and the apparatus further includes an adjustment module configured to, subsequent to determining from said all grasping poses, by the second determining module, the target pose with the minimum degree of transformation relative to the current pose of the robot, adjust the grasping orientation based on a deformability of the clamping device to reduce a difference between the grasping orientation and a current orientation of the clamping device.

With the apparatus for the grasping of the robot based on the collision degree detection according to the embodiments of the present disclosure, when the robot grasps the object to be grasped, all the grasping poses of the robot for grasping the object are calculated based on the clamping device at the operation terminal of the robot and the object to be grasped; the target pose with the minimum degree of transformation relative to the current pose of the robot is determined from all the grasping poses based on the first symmetry degree of the object and the second symmetry degree of the set of contact points between the clamping device and the object; and the collision degree detection is performed on the clamping device to determine the moving path from the current pose to the target pose, and the discretized trajectory points obtained by discretizing the moving path are transmitted to the robot to complete the grasping operation. Consequently, a grasping path of the robot is planned based on the collision degree detection, such that the robot can smoothly grasp the object based on the obtained grasping path while avoiding collisions, thereby improving the intellectualization of the robot.

For the above objectives, embodiments in a seventh aspect of the present disclosure provide an electronic device. The electronic device includes: a memory; a processor; and a computer program stored in the memory and executable on the processor. The processor, when executing the computer program, implements the method for the motion planning of the robot, or the method for the path planning of the robot based on the collision degree detection, or the method for grasping of the robot based on the collision degree detection.

For the above objectives, embodiments in an eighth aspect of the present disclosure provide a computer-readable storage medium having a computer program stored thereon. The computer program, when executed by a processor, implements the method for the motion planning of the robot, or the method for the path planning of the robot based on the collision degree detection, or the method for grasping of the robot based on the collision degree detection.

Additional aspects and advantages of the present disclosure will be given at least in part in the following description, or become apparent at least in part from the following description, or can be learned from practicing of the present disclosure.

BRIEF DESCRIPTION OF DRAWINGS

The above and/or additional aspects and advantages of the present disclosure will become more apparent and more understandable from the following description of embodiments taken in conjunction with the accompanying drawings, in which:

FIG. 3 illustrates a flowchart of a method for path planning of a robot based on collision degree detection according to an embodiment of the present disclosure;

FIG. 4a illustrates a flowchart of a method for grasping of a robot based on collision degree detection according to an embodiment of the present disclosure;

DESCRIPTION OF EMBODIMENTS

Figure 1A:
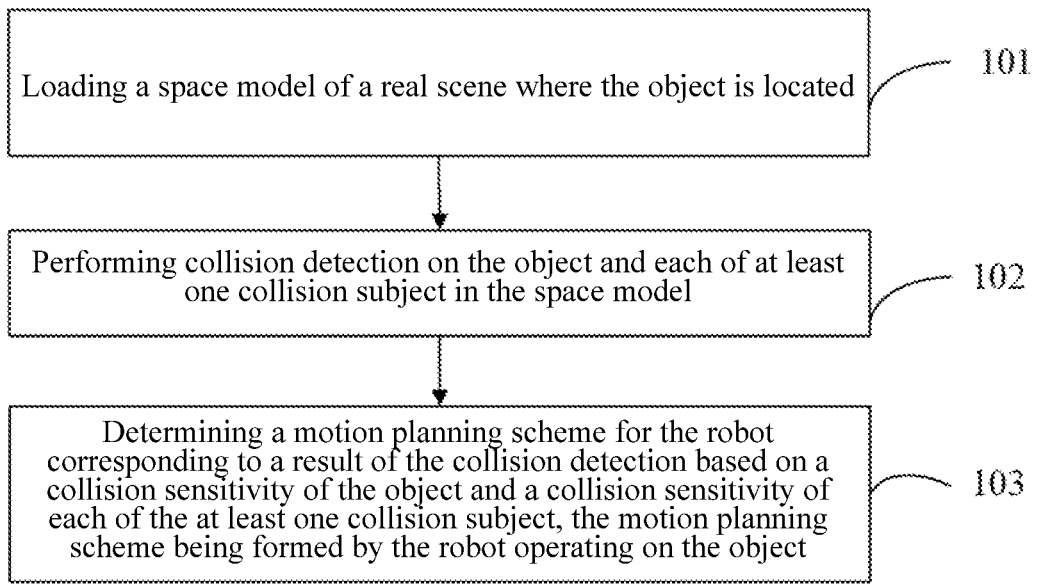
FIG. 1a illustrates a flowchart of a method for motion planning of a robot according to an embodiment of the present disclosure.

The embodiments of the present disclosure will be described in detail below with reference to examples thereof as illustrated in the accompanying drawings, throughout which same or similar elements or elements having same or similar functions are denoted by same or similar reference numerals. The embodiments described below with reference to the drawings are illustrative only, and are intended to explain rather than limit the present disclosure.

A method and an apparatus for motion planning of a robot, an electronic device, and a storage medium according to the embodiments of the present disclosure will be described below with reference to the accompanying drawings.

In a first aspect, the method for the motion planning of the robot of the present disclosure will be introduced.

In some embodiments, the motion planning of the robot is based on collision degree detection, which is defined as collision detection between an object to be operated by a robot (or a certain part of the robot) and a collision subject in a space model where the object is located. The collision degree detection outputs a collision degree between the object and the collision subject, which is used as a reference for motions of the robot corresponding to various types of operations performed by the robot on the object. In some embodiments, the collision degree detection may be performed based on simulation in a virtual scene.

FIG. 1 illustrates a flowchart of a method for motion planning of a robot according to an embodiment of the present disclosure. Here, it should be noted that an execution body of the method for the motion planning of the robot according to this embodiment is an apparatus for motion planning of a robot. The apparatus for the motion planning of the robot is configured in an electronic device. The electronic device is configured to communicate with a robot to perform the collision degree detection on an object to be operated by the robot (or the robot itself), and perform the motion planning on the robot based on a result of the collision detection. Here, the electronic device may include, but is not limited to, a terminal device, a server, etc., which is not limited in the present disclosure. In addition, in some embodiments, the robot optionally involves a robot arm, and a form of the robot arm is not specifically limited. Relevant operations of the present disclosure performed by a six-axis robot, a four-axis robot, and a robot arm not mentioned in the present disclosure shall all fall within the protection scope of the present disclosure.

Optionally, as illustrated in FIG. 1a, the method for the motion planning of the robot may include the following steps.

In step 101, a space model of a real scene where an object is located is loaded.

Figure 1B:
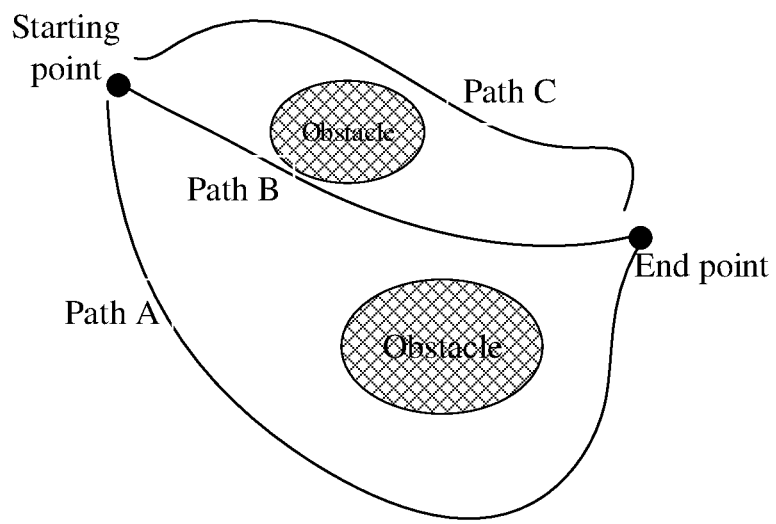
FIG. 1b is an example diagram of a moving path according to an embodiment of the present disclosure.
Figure 1C:
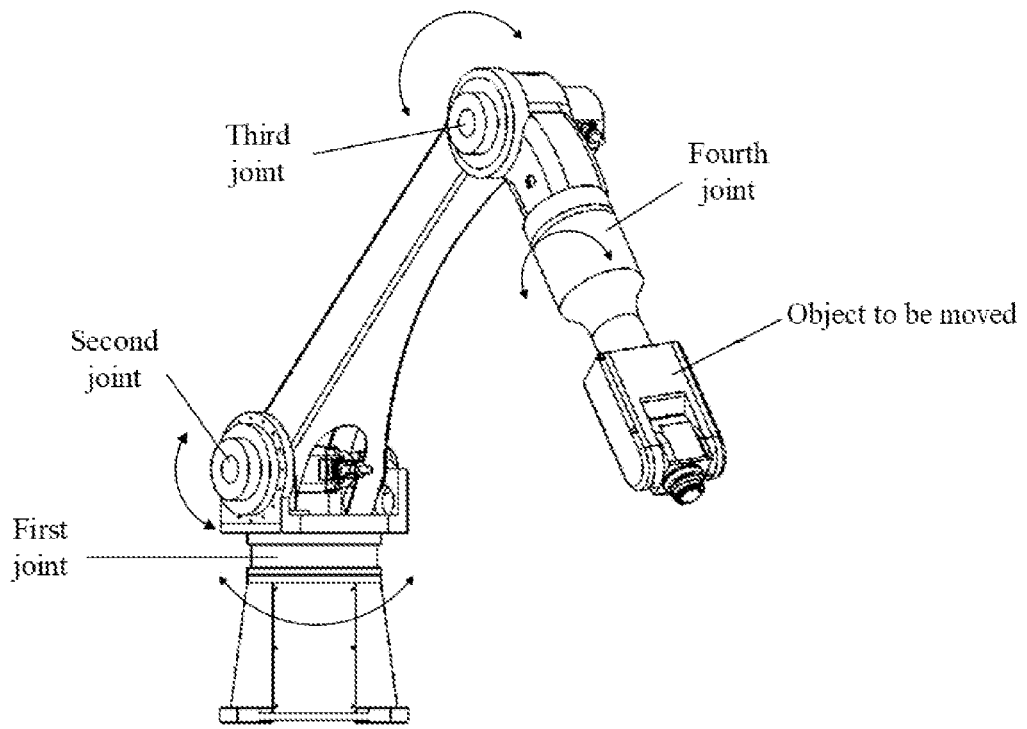
FIG. 1c is a schematic diagram of a robot according to an embodiment of the present disclosure.

When the robot is controlled to operate the object, the object to be operated can be fixed to an operation terminal of the robot, and motion planning of the robot can be performed by an electronic device to obtain a motion planning scheme for the robot. The motion planning can be carried out on a robot motion simulation platform set up in the electronic device. In some embodiments, the motion planning scheme includes a grasping scheme, a moving path planning scheme, and a placement scheme. In some embodiments, the moving path planning scheme includes a multiple-movement-path selection scheme as illustrated in FIG. 1b. In some embodiments, the moving path planning scheme includes a robot posture setting scheme during operations of the robot as illustrated in FIG. 1c.

Operations performed by the robot on the object may include a grasping operation on the object in some related embodiments, a movement operation in some other related embodiments, and a placement operation in yet some other related embodiments; or may include any combination of grasping, movement, or placement in still yet some other embodiments.

Specifically, before a relevant operation, the space model of the real scene where the object to be operated is located can be loaded. In some embodiments, specifically, the space model embodies a real scene in a virtual scene of a related electronic device, and describes a situation of a real space. In some optional embodiments, a specific form of the space model may be a certain data type; or, in some optional embodiments, the space model may be embodied as an electronic device rendering a certain data type to display an effect. In some embodiments, the space model is established based on data of the real scene collected by a sensor.

In some embodiments, the space model can maintain a high degree of correspondence with the real scene. For example, when the real scene includes an operation platform, a workpiece, and a robot, the space model also includes an operation platform, a workpiece, and a robot; when the real scene includes a transport platform, a workpiece, a feeding platform, and a robot, the space model also includes a transport platform, a workpiece, a feeding platform, and a robot; when the real scene includes a transport platform, a tray, a box, and a robot, the space model also includes a transport platform, a tray, a box, and a robot; when the real scene includes a material frame, a small article, a transport platform, and a robot, the space model also includes a material frame, a small article, a transport platform, and a robot; and when the real scene includes a transport platform and a package, the space model also includes a transport platform and a package, and so on. When the situation of the real scene changes, a corresponding situation of the space model changes accordingly. In some embodiments, the change may include other unlisted changes such as a position change, a posture change, and a shape change. In some embodiments, the space model in step 101 may include the robot and the object to be operated.

Optionally, the object to be operated can be any object that the robot can operate, e.g., a box, an industrial part, a small logistics entity, a logistics package, a detector, a glue gun, a cutting tool, etc., such that the collision detection can be performed on a relevant object. The object may even be a part of the robot, and thus the collision detection may be performed on respective parts of the robot to prevent collision. The present disclosure does not specifically limit the object to be operated.

In some embodiments, the space model may be a two-dimensional plane model, e.g., a top-view plane in reality, or a side-view plane in reality. Two-dimensional dimensions corresponding to the two-dimensional plane model can be described by two axes of the Cartesian coordinate system, and the two axes form the plane such as an XOY plane, a YOZ plane, and a XOZ plane.

In some cases, the space model can be changed over time on the basis of the two-dimensional plane model, and the changed content in some other cases matches and corresponds to a content changed in the real scene observed from a corresponding viewing angle, or the changed content in yet some other cases matches and corresponds to a part of a content changed in the real scene observed from a corresponding viewing angle.

In some embodiments, the space model may be a three-dimensional model, which may be described by using the Cartesian coordinate system with any actual spatial point as a reference.

In some cases, the space model can be changed over time on the basis of the three-dimensional model, and the changed content in some cases matches and corresponds to a content changed in the real scene, or the changed content in some other cases matches and corresponds to a part of the content changed in the real scene.

Optionally, the space model of the real scene where the object to be operated is located is pre-established based on scene images of the real scene where the object is located.

Here, an exemplary implementation for establishing a scene image based on the real scene where the object is located may include performing image collection on the real scene based on a visual sensor (such as a three-dimensional industrial camera, a smart industrial camera, and a high-precision industrial camera), and obtaining the space model of the real scene based on scene images collected by the visual sensor.

Optionally, image collection can be performed on the real scene using a visual sensor, point cloud data of the real scene can be obtained based on scene images collected by the visual sensor, and a three-dimensional space model of the real scene can be obtained based on the point cloud data of the real scene.

In step 102, collision detection is performed on the object and at least one collision subject in the space model.

In some embodiments, the at least one collision subject includes any other objects that may collide with the object.

In some embodiments, the collision detection is performed based on a distance between the object and the collision subject.

In some embodiments, the collision detection is performed based on a distance between a simulated object and a simulated collision subject in the virtual scene.

In some embodiments, the collision detection is performed based on a plurality of motion planning schemes of the robot. Illustratively, the motion planning schemes include a movement scheme. In an exemplary embodiment as illustrated in FIG. 1b, when there is a need for the robot to grasp the object and move the object from a starting point to an end point, assuming that a path A, a path B, and a path C are all the results of the motion planning schemes, then collision detection between the object and obstacles in the figure is performed based on a scheme in which the object moves along the path A, a scheme in which the object moves along the path B, and a scheme in which the object moves along the path C to obtain respective collision detection results, and then collision degree detection is completed. It should be noted that this embodiment only enumerates the simplest situation, and in actual situations, there may be more motion planning schemes from the starting point to the end point. In other exemplary embodiments, the motion planning scheme includes a posture change scheme for respective joints, respective parts of a mechanical arm, and other parts during the movement of the robot along a path. Illustratively, in some embodiments, the robot moves the object from a starting point (or an initial point) to a target point (or a final point), which can be realized by a combination of different rotation states of respective joints of the robot. A schematic structural diagram of the robot can be as illustrated in FIG. 1c, and each joint can be rotated in a direction illustrated by an arrow marked around the joint in the figure. In a single combination, each joint corresponds to a respective angle, and the mechanical arm between the joints is in one posture. Therefore, a plurality of combinations corresponds to a plurality of postures. In case of presence of an obstacle around the robot, the mechanical arm in postures of some combinations may collide with the obstacle.

In some embodiments, the collision subject may be any obstacle encountered during the movement of the object or any obstacle in a process of changing postures of the robot.

Illustratively, the motion planning scheme includes a grasping scheme. In actual operations, in different grasping schemes, the robot may perform grasping operations through manners such as clamping or sucking on positions of the object with different grasping forces. Furthermore, the collision detection between the object and the robot is performed based on the grasping schemes with different grasping forces to obtain respective results of the collision detection of the respective schemes, and then the collision degree detection is completed.

Illustratively, the motion planning scheme includes the placement scheme. In some embodiments, in different placement schemes, the robot places the object at different speeds, or from different heights, or in different postures, such that the object may collide with a substance it contacts. A collision detection between the object and a placement surface on which the object is to be placed is performed based on a respective placement scheme to obtain a respective result of the collision detection, and then the collision degree detection is completed.

In some embodiments, the result of the collision detection may be embodied as whether the object collides with the collision subject; or in some embodiments, the result of the collision detection may be embodied as a collision degree between the object and the collision subject. Some embodiment may have a case where the collision degree is zero.

In some embodiments, the collision degree between the object and the collision subject may be embodied as an impact force between the object and the collision subject; and in some embodiments, the collision degree between the object and the collision subject may be embodied as a degree of overlap between the object and the collision subject in the space model. In some embodiments, the degree of overlap is expressed as an overlap area, and in some other embodiments, the degree of overlap is expressed as an overlap volume.

In step 103, a motion planning scheme for the robot corresponding to a result of the collision detection is determined based on a collision sensitivity of the object and a collision sensitivity of each of the at least one collision subject, the motion planning scheme being formed by the robot operating on the object.

In some embodiments, the collision sensitivity is used to measure a collision acceptability of the object or the collision subject.

In some embodiments, a high collision sensitivity indicates a low collision acceptability, and thus a motion planning scheme without collisions should be selected as far as possible; and a low collision sensitivity indicates a high collision acceptability, and thus a motion planning scheme accompanied by collisions can be selected. In some embodiments, when the collision sensitivity is between the high collision acceptability and the low collision acceptability, an optimal scheme can be selected from acceptable motion schemes with reference to the actual situation in conjunction with requirements for tempo, stability, smoothness of movements, safety, etc.

In some embodiments, the collision sensitivity may be embodied as an impact force tolerance threshold of a corresponding substance; and in some embodiments, the collision sensitivity may be embodied as a threshold degree of overlap that a corresponding substance can withstand, etc. In some embodiments, the threshold degree of overlap is expressed as an overlap area, and in other embodiments, the threshold degree of overlap is expressed as an overlap volume.

In some embodiments, the motion planning scheme may include movement trajectory information, movement speed information, grasping force information, placement posture information, other robot kinematics-related information not listed in the embodiments, etc., and any combination of the above information for the robot to operate the object. Alternatively, the motion planning scheme may include a determination of an angle of each part of the robot or a determination of a posture of each part of the robot during relevant operations of the robot.

With the method for the motion planning of the robot according to the embodiments of the present disclosure, when the robot operates on the object to be operated, the collision detection is performed, in combination with the space model of the real scene where the object is located, on the object and the at least one collision subject in the space model; and the motion planning scheme for the robot corresponding to the result of the collision detection is determined based on the collision sensitivity of the object and the collision sensitivity of each of the at least one collision subject, the motion planning scheme being formed by the robot operating on the object, such that the robot can take a motion based on the motion planning scheme when operating the object, thereby avoiding motion stuttering of the robot when the robot operates on the object, smoothing the robot motion, and improving intellectualization of industrial operations of the robot.

Figure 2:
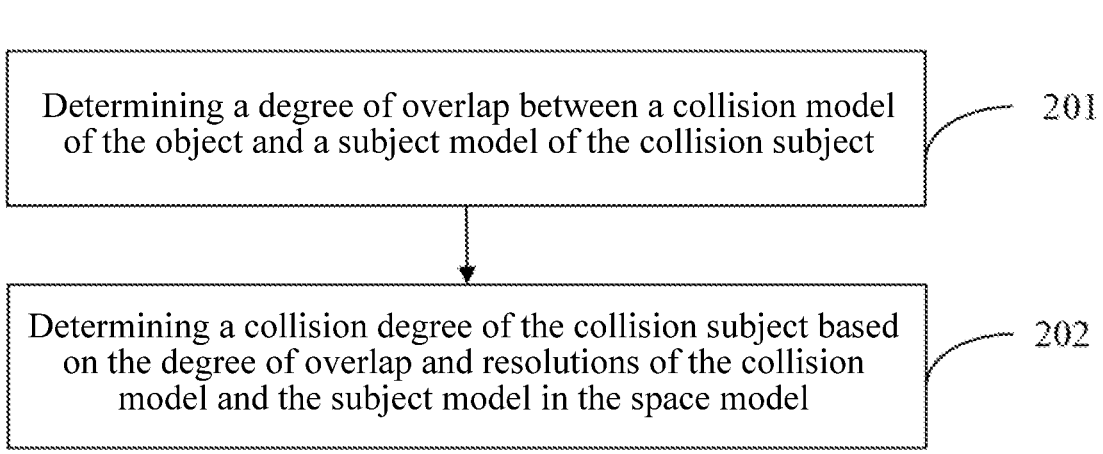
FIG. 2 illustrates a flowchart of performing collision detection on an object and a collision subject in a space model.

In some embodiments of the present disclosure, the collision detection may be performed based on a collision model of the object and a subject model of the collision subject, and further, a specific implementation of the collision detection included in some embodiments of the present disclosure may be exemplarily performed according to steps illustrated in FIG. 2.

In step 201, a degree of overlap between a collision model of the object and a subject model of the collision subject is determined.

In some embodiments, the collision model (and/or the subject model) may be a manifestation form of the object in the virtual scene of the electronic device to reflect a situation corresponding to the object (and/or the collision subject). In some embodiments, the collision model (and/or the subject model) can reflect any or a combination of shape, position, posture, motion state, or other object information of the object (and/or the collision subject).

In some embodiments, a specific form of the collision model (and/or the subject model) may be a certain data type; or, in some optional embodiments, the collision model (and/or the subject model) may be embodied as an electronic device rendering a certain data type to display an effect.

In some embodiments, the collision model (and/or the subject model) is established based on data of the real scene collected by a sensor.

In some embodiments, the collision model (and/or the subject model) may be a two-dimensional plane model, e.g., a top-view plane in reality, or a side-view plane in reality. Two-dimensional dimensions corresponding to the two-dimensional plane model can be described by two axes of the Cartesian coordinate system, and the two axes form the plane such as an XOY plane, a YOZ plane, and a XOZ plane.

In some cases, the collision model (and/or the subject model) can be changed over time on the basis of the two-dimensional plane model, and the changed content in some cases matches and corresponds to a content changed in the object (and/or the collision subject) observed from a corresponding viewing angle, or the changed content in some other cases matches and corresponds to a part of a content changed in the object (and/or the collision subject) observed from a corresponding viewing angle.

In some embodiments, the collision model (and/or the subject model) may be a three-dimensional model, which may be described by using the Cartesian coordinate system with any actual point on the object (and/or the collision subject) as a reference.

In some cases, the collision model (and/or the subject model) can be changed over time on the basis of the three-dimensional model, and the changed content in some cases matches and corresponds to a content changed in the collision model (and/or the subject model) observed from a corresponding viewing angle, or the changed content in some other cases matches and corresponds to a part of the content changed in the collision model (and/or the subject model) observed from a corresponding viewing angle.

In some embodiments of the present disclosure, when the collision model (and/or the subject model) includes a geometric model or a triangular patch model, an occupation situation of a space enclosed by a surface of the collision model of the object and a surface of the subject model of the collision subject can be detected to determine the degree of overlap. Optionally, the occupation situation of the space may be an area or a volume of an overlapping region.

In some embodiments, the collision model of the object (and/or the subject model) can also be an octree model or other similar data forms, based on which, in some embodiments, the occupation situation of the space enclosed by the surface of the collision model and the surface of the subject model can be detected to calculate the degree of overlap.

Here, a larger mutual spatial occupation between the object and the collision subject corresponds to a higher degree of overlap.

In some embodiments of the present disclosure, the collision model includes a set of small cubes in the space model that match a condition of the object to be operated, and the subject model includes a set of small cubes in the space model that match the condition of the collision subject.

In some embodiments, a specific method for determining the degree of overlap includes: for each small cube in the set of small cubes of the object, determining whether the set of small cubes of the collision subject includes a corresponding small cube that intersects the small cube at at least one point in space; if yes, determining that the small cube in the set of small cubes of the object collides with the corresponding small cube in the set of small cubes of the collision subject, counting a number of small cubes that have collision between the object and the collision subject, and determining the degree of overlap between the object and the collision subject based on the number of the small cubes.

In step 202, a collision degree of the collision subject is determined based on the degree of overlap and resolutions of the collision model and the subject model.

In some embodiments, the collision model includes a set of pixels formed by dividing a space occupied by the object at a certain resolution in the space model, and the subject model includes a set of pixels formed by dividing a space occupied by the collision subject at another resolution in the space model.

In some implementations, a specific method for determining the collision degree includes: determining a set of overlapping pixels between the collision model and the subject model; and determining a depth weight of each pixel of the set of overlapping pixels based on distances between the pixel and corresponding surfaces of the models, and determining the collision degree between the collision model and the subject model based on the depth weight in combination of a degree of overlap, the degree of overlap being a number of pixels in the set of overlapping pixels.

In some implementations, the collision model includes a set of small cubes formed by dividing a space occupied by the object at a first resolution in the space model, and the subject model includes a set of small cubes formed by dividing a space occupied by the collision subject at a second resolution in the space model.

In some implementations, a specific method for determining the collision degree includes: determining a set of overlapping cubes between the collision model and the subject model; and determining a depth weight of each small cube in the set of overlapping cubes based on distances between the small cube and corresponding surfaces of the models, and determining the collision degree between the collision model and the subject model based on the depth weight and the degree of overlap, the degree of overlap being a number of small cubes in the set of overlapping cubes.

Here, it can be understood that in different application scenes, the robot can perform different operations on the object, and different operations usually correspond to different collision subjects. In some embodiments of the present disclosure, when the operation performed by the robot on the object includes the movement operation, the collision subject may include a plurality of subjects overlapping the space occupied by the object on respective moving paths in the motion planning scheme after a grasping operation on the object and before a placement operation on the object.

In an optional embodiment of the present disclosure, when the operation performed by the robot on the object further includes the grasping operation, the collision subject may further include a clamping device at an operation terminal of the robot during the grasping operation on the object.

In an optional embodiment of the present disclosure, when the operation performed by the robot on the object further includes the placement operation, the collision subject may further include a contact object with which the object is in contact when being placed by the robot during the placement operation. In some embodiments, the contact object includes a substance that contacts the object instantaneously when the object is placed, e.g., another object placed by the robot before this operation, and below or at a side of the object to be placed, or another object that is not placed by the robot and is below or at a side of the object to be placed, or a platform for placing the object, etc.

Alternatively, the collision subject may include a plurality of subjects overlapping a space occupied by any part of the robot during posture change of the robot when the robot performs relevant operations in the motion planning scheme.

In a second aspect, a method for path planning of a robot based on collision degree detection of the present disclosure will be introduced.

FIG. 3 illustrates a flowchart of a method for path planning of a robot based on collision degree detection according to an embodiment of the present disclosure. Here, it should be noted that an execution body of the method for the path planning of the robot based on the collision degree detection according to this embodiment is an apparatus for path planning of a robot. In some embodiments, the apparatus for the path planning of the robot is configured in an electronic device. The electronic device is configured to communicate with the robot to perform moving path planning on the robot.

As illustrated in FIG. 3, a method for moving path planning of the robot may include the following steps.

In step 301, when the robot completes a grasping operation on the object, moving path planning is performed on the robot based on the collision degree detection, a moving path corresponding to a result of the moving path planning is discretized, and discretized trajectory points obtained by the discretizing are transmitted for the robot to move.

In an optional embodiment of the present disclosure, when the robot completes the grasping operation on the object, the moving path planning can be performed on the robot based on the collision degree detection to obtain a result of the moving path planning of the robot, and then the moving path corresponding to the result of the moving path planning is discretized to obtain the discretized trajectory points.

The moving path planning may include movement scheme planning. In an exemplary embodiment as illustrated in FIG. 1b, when there is a need for the robot to grasp the object and moves the object from the starting point to the end point, it is assumed that the path A, the path B, and the path C are all the results of the movement scheme planning Therefore, in some embodiments, a specific process of performing the moving path planning on the robot based on the collision degree detection includes performing the collision detection on the object and the collision subject (e.g., obstacles in FIG. 1b) during the movement based on a scheme in which the object moves along the path A, a scheme in which the object moves along the path B, and a scheme in which the object moves along the path C to obtain collision degrees of respective schemes, so as to complete the collision degree detection. It should be noted that this embodiment only enumerates the simplest situation, and in actual situations, there may be more motion planning schemes from the starting point to the end point.

In some other exemplary embodiments, the moving path planning may include a posture change scheme for respective joints, respective parts of a mechanical arm, and other parts during the movement of the robot along a path. Illustratively, in some embodiments, the robot moves the object from a starting point (or an initial point) to a target point (or a final point), which can be realized by a combination of different rotation states of respective joints of the robot. A schematic structural diagram of the robot can be as illustrated in FIG. 1c, and each joint can be rotated in a direction illustrated by an arrow marked around the joint in the figure. In a single combination, each joint corresponds to a respective angle, and the mechanical arm between the joints is in one posture. Therefore, a plurality of combinations corresponds to a plurality of postures. In some embodiments, on the basis of different postures of the robot in multiple combinations, the collision detection is performed on each part of the robot, e.g., a mechanical arm between a first joint and a second joint, or between a fifth joint and a sixth joint, or between respective joints, and the collision subject encountered during a movement process in which the posture changes to obtain respective collision degrees, so as to complete the collision degree detection.

For the specific collision detection method, reference may be made to the related description in the embodiments of the method for the motion planning of the robot in the first aspect, and details thereof will be omitted here.

The discretized points obtained in a discretization process of a specific path can be feature points of the path, and the discretization process can be implemented by a robot kinematics-related discretization method in the related art, details of which will be omitted here.

In step 302, a moving time point of the robot corresponding to each of the discretized trajectory points is determined based on a moving speed of the robot, and the collision detection is performed on the object at the moving time point.

In some embodiments, at each moving time point, the collision detection is performed on the object and the collision subject in the space model of the real scene where the object is located. Here, the space model corresponds to a situation of the real scene at the moving time point.

In some embodiments, for the relevant description of the collision detection performed on the object and the collision subject in the space model, reference can be made to relevant description in the embodiments of the method for the motion planning of the robot in the first aspect, details of which will be omitted here.

Here, for an establishment process of the space model, reference may be made to the relevant description in the embodiments of the method for the motion planning of the robot in the first aspect, details of which will be omitted here.

In step 303, the robot is stopped from moving at a time point when a collision degree is higher than the collision sensitivity of the object to prevent an occurrence of danger.

In some embodiments, when the collision degree at a certain time point is higher than the collision sensitivity of the object or the collision sensitivity of the collision subject, the moving of the robot is stopped.

It should be noted that in related embodiments, the collision degree being higher than the collision sensitivity can be schematically understood as an article having the collision sensitivity cannot bear the collision degree, and thus the robot stops moving to ensure the intactness and safety of the article.

For relevant description of the collision sensitivity, reference may be made to the related description in the embodiments of the method for the motion planning of the robot in the first aspect, details of which will be omitted here.

That is, in this embodiment, when the robot performs the movement operation on the object, the collision detection is performed on the object at each moving time point of the robot, and the movement operation of the robot is controlled based on the result of the collision detection, thereby providing the method for the moving path planning of the robot based on the collision detection, and improving the intellectualization of the robot.

With the method for the path planning of the robot based on the collision degree detection according to the embodiments of the present disclosure, when the robot complete the grasping operation on the object, the moving path planning is performed on the robot based on the collision degree detection, the moving path corresponding to the result of the moving path planning is discretized, and the discretized trajectory points obtained by the discretizing are transmitted for the robot to move; the moving time point of the robot corresponding to each of the discretized trajectory points is determined based on the moving speed of the robot, and the collision detection is performed on the object at the moving time point; and the robot is stopped from moving at a time point when the collision degree is higher than the collision sensitivity of the object, to prevent the occurrence of danger. Consequently, in a case where smooth motions of the robot are ensured, the collision detection is performed on the object at respective moving time points of the robot based on the collision degree detection, and when it is determined that the collision degree corresponding to a certain moving time point is higher than the collision sensitivity of the object, the robot is controlled to stop moving, such that the operation safety of the robot is ensured, and intactness of the operated object is protected, thereby further improving the intellectualization of the robot while ensuring smooth motions of the robot.

In a third aspect, a method for grasping of a robot based on the collision degree detection of the present disclosure is introduced.

Figure 4B:
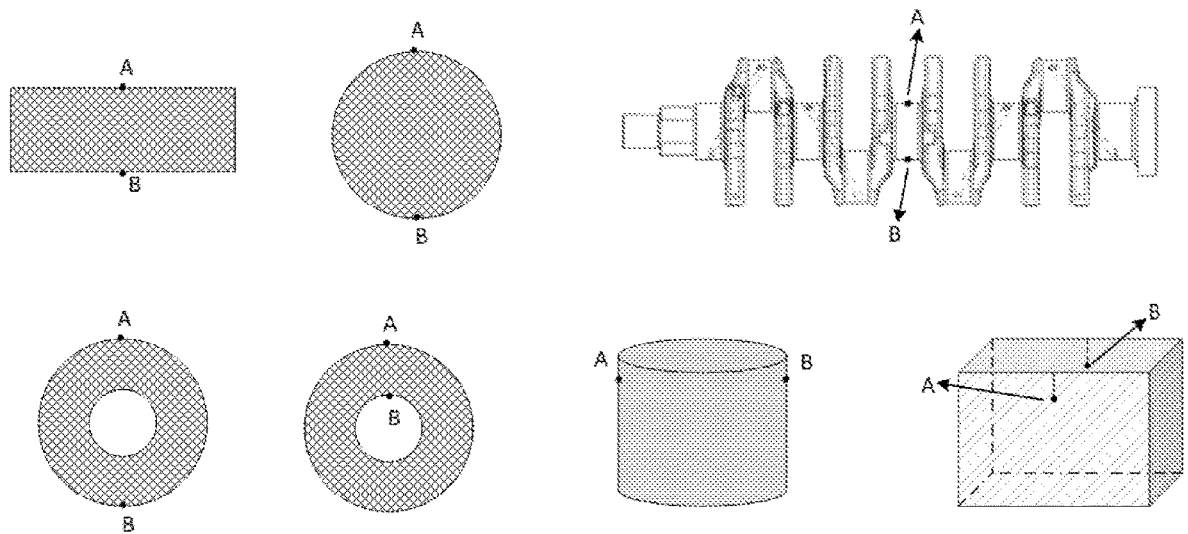
FIG. 4b is a schematic example diagram showing a set of discontinuous contact points.

FIG. 4a illustrates a flowchart of a method for grasping of a robot based on collision degree detection according to an embodiment of the present disclosure. Here, it should be noted that an execution body of the method for the grasping of the robot based on the collision degree detection according to this embodiment is an apparatus for grasping of a robot based on collision degree detection, and the apparatus for the grasping of the robot based on the collision degree detection is configured in an electronic device. The electronic device is configured to communicate with the robot to plan the grasping scheme for the robot.

As illustrated in FIG. 4a, the method for the grasping of the robot based on the collision degree detection may include the following steps.

In step 401, all grasping poses of the robot for grasping the object are calculated based on a clamping device at an operation terminal of the robot and an object to be grasped.

Illustratively, in practical applications where the robot needs to perform the grasping operation, the operation terminal of the robot (i.e., a joint angle of the operation terminal of the robot) is fixed to the clamping device. The clamping device is configured to grasp objects.

In some embodiments, the clamping device may be a gripper, a clip, or a suction cup, or a combination thereof, etc., and is configured to obtain the object, such that the object can move with the robot or perform a relevant operation.

In some specific embodiments, a grasping point (and/or grasping force) is determined with reference to an actual shape, an actual size, and an actual weight of the object, and then a corresponding type of the clamping device matching the grasping point is determined.

In some embodiments, all the grasping poses can be determined based on the pose of the object and the type of the clamping device. The grasping pose refers to a grasping position and a grasping posture.

In step 402, a target pose with a minimum degree of transformation relative to a current pose of the robot is determined from the grasping poses based on a first symmetry degree of the object and a second symmetry degree of a set of contact points between the clamping device and the object.

Figure 4C:
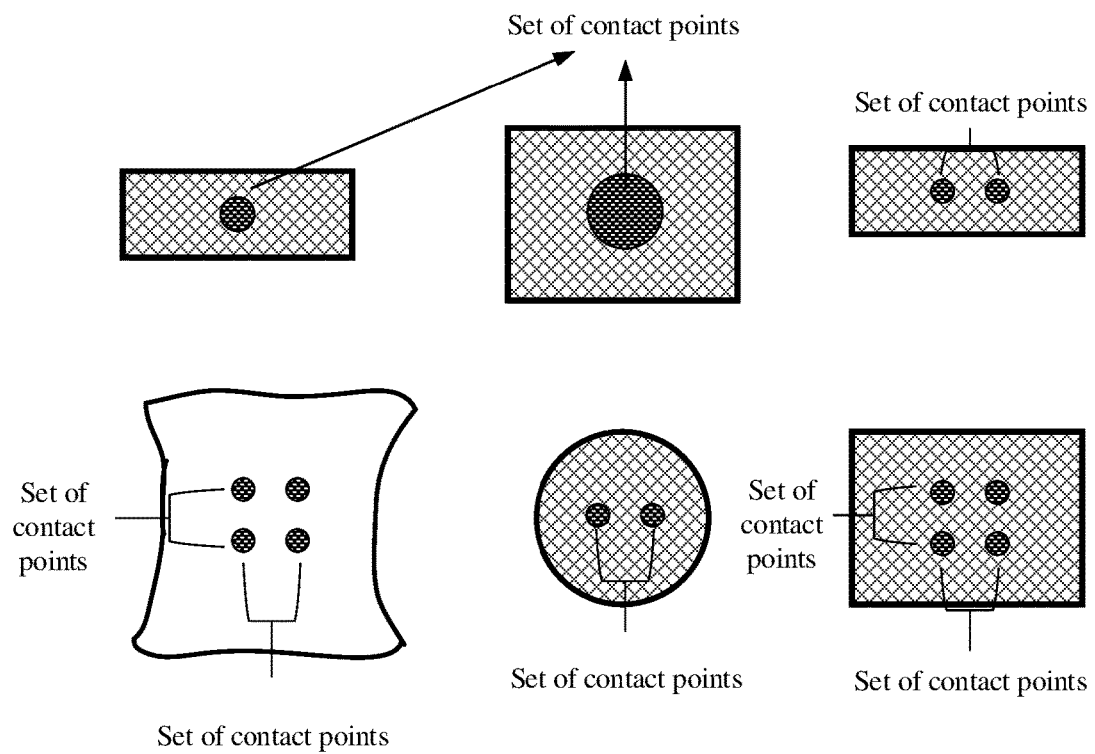
FIG. 4c is a schematic example diagram showing a set of continuous contact points.

In some embodiments, the object (and/or the set of contact points) is symmetrical, and thus a case may be that different grasping poses among said all grasping poses of the robot can achieve the same grasping effect. In a schematic embodiment illustrated in FIG. 4f, two grasping poses of the gripper, i.e., two grasping poses with different left to right sequences of two gripping fingers, can both make the two gripping fingers fall on contact points A and B for gripping to achieve the same gripping effect. In some preferred embodiments, a target pose that is similar to a current pose or allows smoother movement is selected, based on the symmetry degree, from a plurality of grasping poses of the gripper for the grasping operation, which is beneficial to smooth motions of the robot and improves the intellectualization of the robot.

In some embodiments, the symmetry degree includes a degree of symmetry. When a body of an article forms mirror images along a certain direction vector passing through a range defined by the article, it is considered that the article has symmetry; when a body of a symmetrical article can form mirror images along different direction vectors passing through a range defined by the article, it is considered that the article has a high symmetry degree, and simple illustrative examples of the article include circles and spheres; when a body of a symmetrical article can only form mirror images along a specific direction vector, it is considered that the symmetrical article has a low symmetry degree, and simple illustrative examples of the symmetrical article include rectangles and cuboids; and for a polygon with equal sides, such as equilateral triangles, squares, and equilateral hexagons, the symmetry degree of the polygon is determined based on a number of available direction vectors along which a body of the polygon can form mirror images.

In some embodiments, the symmetry degree includes a degree of symmetry. If a body of an article, after rotating about a certain reference rotation point located within a range defined by the article, can coincide with the body of the article before the rotating only if a rotation degree of the rotating is 0° or 360°, it is considered that the article has a low symmetry degree; if a body of an article, after rotating by any angle about a certain reference rotation point located within a range defined by the article, can coincide with the body of the article before the rotating, it is considered that the article has a high symmetry degree; and if a body of an article, after rotating by an angle (except 0°) about a reference rotation point located within a range defined by the article, can coincide with the body of the article before the rotating, the smaller the angle, the higher the symmetry degree of the article. In a preferred embodiment, the reference rotation point includes a center point in a corresponding range, and optionally, the reference rotation point may include a center of mass. In some embodiments, the reference rotation point is a center point of a plane observed from a viewing angle of a corresponding range, such as a center of a circle corresponding to the top view of a sphere, a center of a circular ring observed in an axial direction of the circular ring, etc.; and in some embodiments, the rotation point is a center point of a three-dimensional structure of an article, such as a center point of a sphere, a center point of a cuboid, etc.

In some embodiments, the symmetry degree is embodied as an angle value, and thus the object, after rotating by an angle value corresponding to the first symmetry degree, coincides with the object before the rotating, and the set of contact points, after rotating by an angle value corresponding to the second symmetry degree, coincides with the set of contact points before the rotating.

Here, the pose includes a position and a posture.

In some embodiments, the symmetry of the object includes a symmetry of a mass distribution of the object. In some other embodiments, the symmetry of the object includes symmetry of a shape of the object.

It can be understood that the set of contact points may be continuous in some embodiments or discontinuous in some other embodiments. A simple exemplary embodiment is described below. For an exemplary embodiment of a set of discontinuous contact points, reference can be made to compositions of points A and B in various objects in FIG. 4b. For an exemplary embodiment of a set of continuous contact points, reference can be made to a highlighted shadow display portion on each object in FIG. 4c.

Figure 4D:
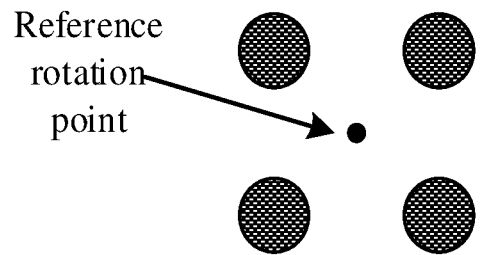
FIG. 4d is a first example diagram showing a reference rotation point of a set of contact points.
Figure 4E:
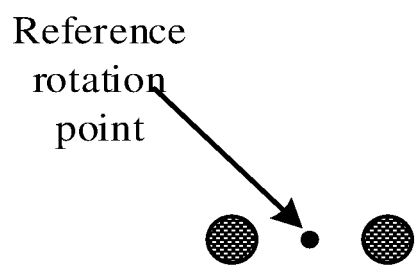
FIG. 4e is a second example diagram showing a reference rotation point of a set of contact points.
Figure 4F:
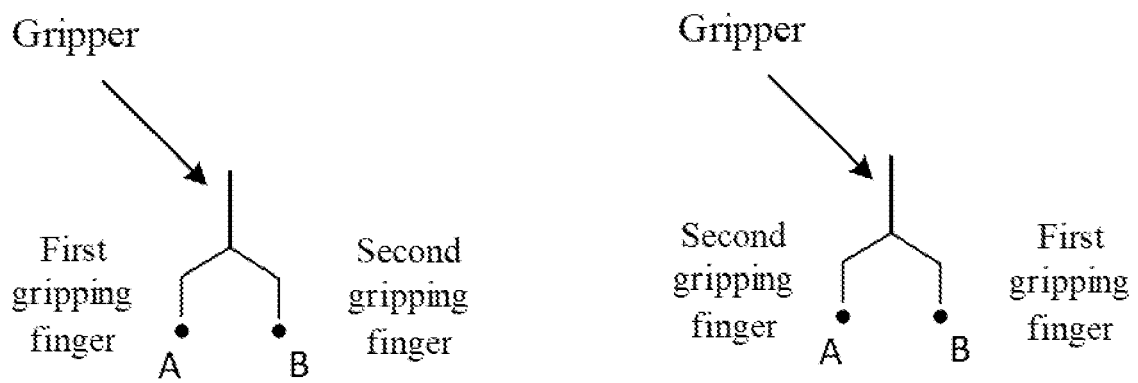
FIG. 4f is an example diagram showing grasping poses of a gripper.

In some embodiments, the symmetry degree of the set of contact points may be as illustrated in FIG. 4d to FIG. 4e. In FIG. 4d, a set of contact points, after rotating by 90° about the reference rotation point, coincides with the set of contact points before the rotating, and in FIG. 4e, a set of contact points, after rotating by 180° about the reference rotation point, coincides with the set of contact points before the rotating. The symmetry degree of the set of contact points illustrated in FIG. 4d is higher than the symmetry degree of the set of contact points illustrated in FIG. 4e.

In some embodiments, in order to minimize a rotation angle of each joint angle of the robot during a process of grasping the object, after all the grasping poses of the robot to grasp the object are obtained, the target pose with the minimum degree of transformation relative to the current pose of the robot is determined from all the grasping poses based on the first symmetry degree of the object and the second symmetry degree of the set of contact points between the clamping device and the object.

In step 403, the collision degree detection is performed on the clamping device to determine a moving path from the current pose to the target pose, the moving path is discretized to obtain discretized trajectory points, and the discretized trajectory points are transmitted to the robot for completing a grasping operation.

In the embodiments of the present disclosure, the grasping scheme for the robot is determined based on the collision degree detection. After the current pose and the target pose of the robot are obtained, the collision degree detection is performed on the clamping device, and then the grasping scheme is selected within a tolerable collision degree. In this case, a number of selectable schemes can be increased, and a possibility that the selectable schemes include a smooth and feasible grasping scheme increases, thereby improving smoothness of movements of the robot to a certain extent, reducing the probability of occurrence of singularity, and enhancing the intellectualization of the robot. In addition, since the target pose is determined based on the symmetry degree, the number of selectable schemes can be further increased to assist the robot in determining the target pose used for the grasping operation, the target pose being relatively conducive to smooth movements, thereby further improving the smoothness of movements of the robot, and enhancing the intellectualization of the robot.

Here, the space model is a space model corresponding to a real scene where the clamping device is located.

In some embodiments, a specific implementation method for performing the collision degree detection on the clamping device to determine the moving path from the current pose to the target pose includes: obtaining a plurality of candidate moving paths from the current pose to the target pose of the robot, performing, for each candidate moving path, the collision degree detection on the clamping device to obtain respective results of the collision detection corresponding to the plurality of candidate moving paths, selecting from the respective results of the collision detection a candidate moving path corresponding to a collision degree that the gripper (and/or a collision subject) can withstand as the moving path from the current pose to the target pose, and transmitting the moving path to the robot to complete the grasping operation.

In some embodiments of the present disclosure, the clamping device includes a suction cup, and the object includes a box body.

In some embodiments, suction cups are arranged in an array to form a rectangular suction cup.

In some embodiments, it can be determined whether an area of the suction cup is identical to an area of a grasped surface of the box body. When the area of the suction cup is different from the area of the grasped surface of the box body, the grasping pose of the robot can be determined in the following manners.

In manner 1, a suction region on the grasped surface is determined by aligning a center of the suction cup with a center of the grasped surface; or in manner 2, the suction region on the grasped surface is determined by aligning a vertex angle of the suction cup with a vertex angle of the grasped surface; or in manner 3, the suction region on the grasped surface is determined by aligning a long side of the suction cup with a long side of the grasped surface; or in manner 4, the suction region on the grasped surface is determined by aligning a short side of the suction cup with a short side of the grasped surface. After the suction region is determined by any of the above manners, all grasping poses of the robot are calculated based on the determined suction region, in which the suction region includes an orthographic projection point of a center of mass of the box body on the grasped surface.

In some embodiments, the grasped surface includes a top view surface of the box body, or in other embodiments, the grasped surface includes a side view surface of the box body.

Figure 4G:
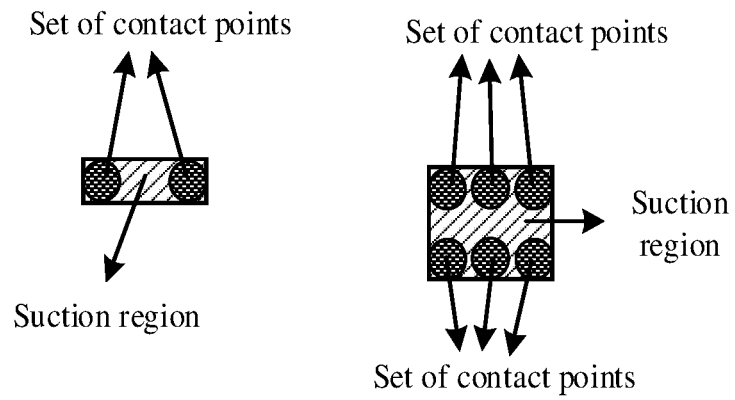
FIG. 4g is an example diagram showing a suction region including a set of contact points.

In some embodiments, as illustrated in FIG. 4g, the suction region includes a set of contact points.

In some embodiments, suction cups are arranged in an array to form a rectangular suction cup, and thus vertex angles of the suction cups include vertex angles of the rectangular suction cup, long sides of the suction cups include a long side of the rectangular suction cup in some embodiments, and short sides of the suction cups include a short side of the rectangular suction cup in some embodiments.

In some embodiments, when suction cups are arranged in an array to form a rectangular suction cup having an area greater than the grasped surface, long sides of the suction cups includes a long side of the rectangular suction cup that is translated by one row of suction cups towards an inside of the rectangular suction cup; short sides of the suction cups includes a short side of the rectangular suction cup that is translated by one row of suction cups towards an inside of the rectangular suction cup; and vertex angles of the suction cups includes a vertex angle formed by the translated long side and the translated short side. Of course, in some embodiments, the translation may be a translation by two or more rows of suction cups within a range of the array of suction cups. In some embodiments, a number of rows by which the long side is translated may be different from a number of rows by which the short side is translated.

In some embodiments, the target pose may include a position and a posture of the clamping device, and the posture includes a grasping orientation at which the clamping device faces the object. In some embodiments of the present disclosure, the clamping device faces towards the object to complete the grasping operation. Specifically, the clamping device grasps the object along a normal direction of the grasped surface of the object to be grasped. Alternatively, in some embodiments, in order to facilitate the clamping device of the robot to grasp the object to be grasped, the clamping device can be deviated from the normal direction of the grasped surface of the object to be grasped. Specifically, after the target pose with the minimum degree of transformation relative to the current pose of the robot is determined from said all grasping poses, the grasping orientation can be adjusted based on a deformability of the clamping device to reduce a difference between the grasping orientation and a current orientation of the clamping device, thereby assisting the robot in determining the target pose that is more conducive to smooth movements for the grasping operation, further improving the smoothness of movements of the robot, and further enhancing the intellectualization of the robot.

In some embodiments of the present disclosure, the grasping operation is performed on the object to be grasped by the deformability-based clamping device, such that when the robot grasps the object to be grasped through the clamping device, an orientation of the clamping device of the robot does not need to be strictly aligned with the normal direction of the grasped surface, the target pose can be closer to an initial pose, and the intellectualization of the robot can be further improved.

With the method for the grasping of the robot based on the collision degree detection according to the embodiments of the present disclosure, when the robot grasps the object to be grasped, all the grasping poses of the robot for grasping the object are calculated based on the clamping device at the operation terminal of the robot and the object to be grasped; the target pose with the minimum degree of transformation relative to the current pose of the robot is determined from all the grasping poses based on the first symmetry degree of the object and the second symmetry degree of the set of contact points between the clamping device and the object; and the collision degree detection is performed on the clamping device to determine the moving path from the current pose to the target pose, and the discretized trajectory points obtained by discretizing the moving path are transmitted to the robot to complete the grasping operation. Consequently, a grasping path of the robot is planned based on the collision degree detection, such that the robot can smoothly grasp the object based on the obtained grasping path while avoiding collisions, thereby further improving the intellectualization of the robot.

Figure 5:
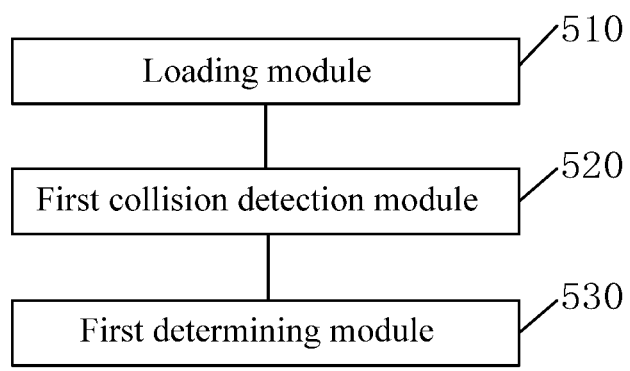
FIG. 5 is a schematic diagram showing a structure of an apparatus for motion planning of a robot according to an embodiment of the present disclosure.

FIG. 5 is a schematic diagram showing a structure of an apparatus for motion planning of a robot according to an embodiment of the present disclosure.

As illustrated in FIG. 5, the apparatus for the motion planning of the robot is characterized in performing the collision degree detection on an object. The apparatus can include a loading module 510, a first collision detection module 520, and a first determining module 530.

The loading module 510 is configured to load a space model of a real scene where the object is located.

The first collision detection module 520 is configured to perform collision detection on the object and at least one collision subject in the space model.

The first determining module 530 is configured to determine, based on a collision sensitivity of the object and a collision sensitivity of each of the at least one collision subject, a motion planning scheme for the robot corresponding to a result of the collision detection, the motion planning scheme being formed by the robot operating on the object.

Here, it should be noted that the above explanation of the embodiments of the method for the motion planning of the robot is also applicable to the apparatus for the motion planning of the robot according to this embodiment, and details thereof will be omitted here.

With the apparatus for the motion planning of the robot according to the embodiments of the present disclosure, when the robot conducts an operation on the object to be operated, the collision detection is performed, in combination with the space model of the real scene where the object is located, on the object and the at least one collision subject in the space model, the motion planning scheme for the robot corresponding to a result of the collision detection is determined based on the collision sensitivity of the object and the collision sensitivity of each of the at least one collision subject, the motion planning scheme being formed by the robot operating on the object, such that the robot can move based on the motion planning scheme when operating the object, thereby avoiding the motion stuttering in a robot motion process when the robot operates on the object, smoothing robot motions, and improving intellectualization of industrial operations of the robot.

Figure 6:
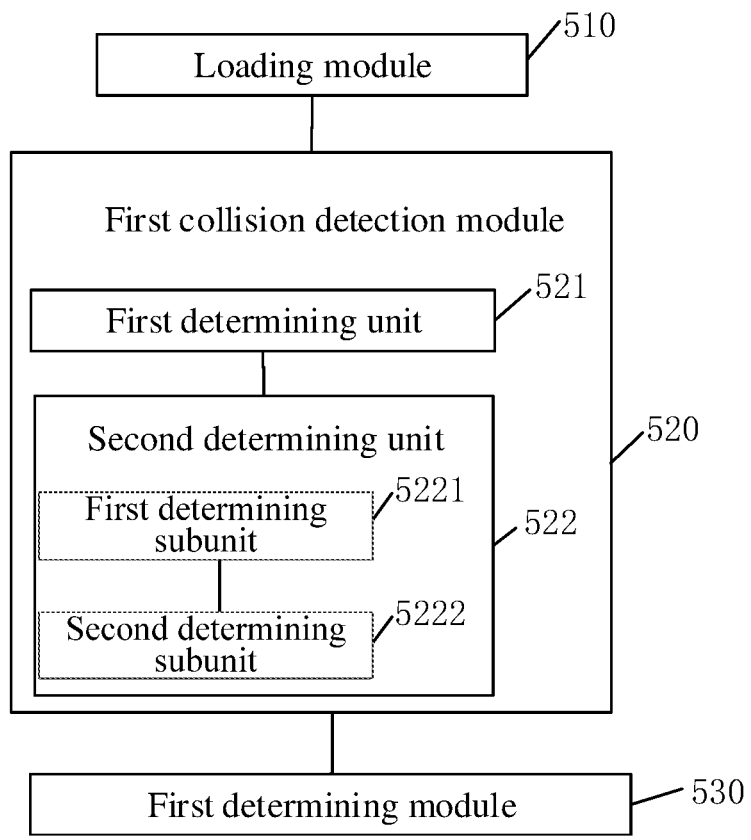
FIG. 6 is a schematic diagram showing a structure of another apparatus for motion planning of a robot according to an embodiment of the present disclosure.

In an embodiment of the present disclosure, on the basis of an apparatus embodiment illustrated in FIG. 5, the first collision detection module 520 includes a first determining unit 521 and a second determining unit 522, as illustrated in FIG. 6.

The first determining unit 521 is configured to determine a degree of overlap between a collision model of the object and a subject model of the collision subject.

The second determining unit 522 is configured to determine a collision degree of the collision subject based on the degree of overlap and resolutions of the collision model and the subject model in the space model.

In an embodiment of the present disclosure, the collision model includes a set of small cubes formed by dividing a space occupied by the object at a first resolution in the space model, and the subject model includes a set of small cubes formed by dividing a space occupied by the collision subject at a second resolution in the space model.

In an embodiment of the present disclosure, the second determining unit 522 includes a first determining subunit 5221 and a second determining subunit 5222.

The first determining subunit 5221 is configured to determine a set of overlapping cubes between the collision model and the subject model.

The second determining subunit 5222 is configured to determine a depth weight of each small cube in the set of overlapping cubes based on distances between the small cube and corresponding surfaces of the models, and determine a collision degree between the collision model and the subject model based on the depth weight and the degree of overlap, the degree of overlap being a number of small cubes in the set of overlapping cubes.

In an embodiment of the present disclosure, the at least one collision subject includes a plurality of subjects overlapping the space occupied by the object on respective moving paths taken by the robot after a grasping operation on the object and before a placement operation on the object; and/or the at least one collision subject includes a clamping device at an operation terminal of the robot during the grasping operation on the object; and/or the at least one collision subject includes a contact object with which the object is in contact when being placed by the robot during the placement operation.

Figure 7:
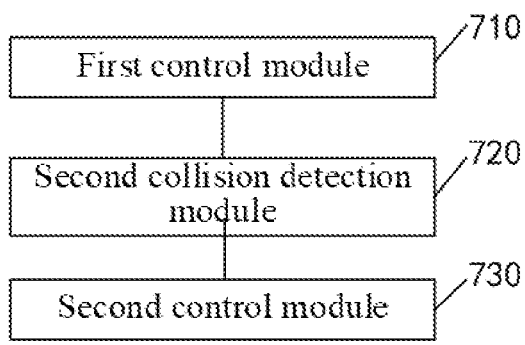
FIG. 7 is a schematic diagram showing a structure of an apparatus based on collision degree detection according to an embodiment of the present disclosure.

FIG. 7 is a schematic diagram showing a structure of an apparatus for path planning of a robot based on collision degree detection according to an embodiment of the present disclosure.

As illustrated in FIG. 7, the apparatus for the path planning of the robot based on the collision degree detection may include a first control module 710, a second collision detection module 720, and a second control module 730.

The first control module 710 is configured to: when the robot completes a grasping operation on an object, perform moving path planning on the robot based on the collision degree detection, discretize a moving path corresponding to a result of the moving path planning, and transmit discretized trajectory points obtained by the discretizing for the robot to move.

The second collision detection module 720 is configured to determine a moving time point of the robot corresponding to each of the discretized trajectory points based on a moving speed of the robot, and perform collision detection on the object at the moving time point.

The second control module 730 is configured to stop moving of the robot at a time point when a collision degree is higher than a collision sensitivity of the object, to prevent an occurrence of danger.

In an embodiment of the present disclosure, the second collision detection module 720 is specifically configured to perform the collision detection on the object and a collision subject in the space model of the real scene where the object is located at each moving time point, the space model corresponding to a situation of the real scene at the moving time point.

The second control module 730 is specifically configured to stop moving of the robot at a time point when the collision degree is higher than the collision sensitivity of the object or the collision sensitivity of the collision subject.

Here, it should be noted that the above explanation of the embodiments of the method for the path planning of the robot based on the collision degree detection is also applicable to the apparatus for the path planning of the robot based on the collision degree detection according to this embodiment, and details thereof will be omitted here.

With the apparatus for the path planning of the robot based on the collision degree detection according to the embodiments of the present disclosure, when the robot completes the grasping operation on the object, the moving path planning is performed on the robot based on the collision degree detection, the moving path corresponding to the result of the moving path planning is discretized, and the discretized trajectory points obtained by the discretizing are transmitted for the robot to move; the moving time point of the robot corresponding to each of the discretized trajectory points is determined based on the moving speed of the robot, and the collision detection is performed on the object at each moving time point; and the robot is stopped from moving at a time when the collision degree is higher than the collision sensitivity of the object, to prevent the occurrence of danger. Consequently, in a case where smooth motions of the robot are ensured, the collision detection is performed on the object at respective moving time points of the robot based on the collision degree detection, and when it is determined that the collision degree corresponding to a certain moving time point is higher than the collision sensitivity of the object, the robot is controlled to stop moving, such that the operation safety of the robot is ensured, and intactness of the operated object is protected, thereby further improving the intellectualization of the robot while ensuring smooth motions of the robot.

Figure 8:
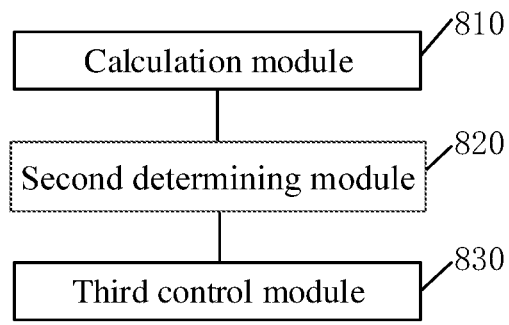
FIG. 8 is a schematic diagram showing a structure of an apparatus for grasping of a robot based on collision degree detection according to an embodiment of the present disclosure.

FIG. 8 is a schematic diagram showing a structure of an apparatus for grasping of a robot based on collision degree detection according to an embodiment of the present disclosure.

As illustrated in FIG. 8, the apparatus for the grasping of the robot based on the collision degree detection may include a calculation module 810, a second determining module 820, and a third control module 830.

The calculation module 810 is configured to calculate, based on a clamping device at an operation terminal of the robot and an object to be grasped, all grasping poses of the robot for grasping the object.

The second determining module 820 is configured to determine, based on a first symmetry degree of the object and a second symmetry degree of a set of contact points between the clamping device and the object, a target pose with a minimum degree of transformation relative to a current pose of the robot from the grasping poses.

The third control module 830 is configured to perform the collision degree detection on the clamping device to determine a moving path from the current pose to the target pose, and transmit to the robot trajectory points obtained by discretizing the moving path to complete a grasping operation.

In an embodiment of the present disclosure, the first symmetry degree and the second symmetry degree are each an angle value, the object, after rotating by an angle value corresponding to the first symmetry degree coincides with the object before the rotating, and the set of contact points, after rotating by an angle value corresponding to the second symmetry degree coincides with the set of contact points before the rotating.

In an embodiment of the present disclosure, the clamping device includes a suction cup, the object includes a box body, and the calculation module 810 is specifically configured to: when the suction cup has an area different from that of a grasped surface of the box body, determine a suction region on the grasped surface by aligning a center of the suction cup with a center of the grasped surface, or by aligning a vertex angle of the suction cup with a vertex angle of the grasped surface, or by aligning a long side of the suction cup with a long side of the grasped surface, or by aligning a short side of the suction cup with a short side of the grasped surface; and calculate all the grasping poses of the robot based on the determined suction region, in which the suction region includes an orthographic projection point of a center of mass of the box body on the grasped surface.

Figure 9:
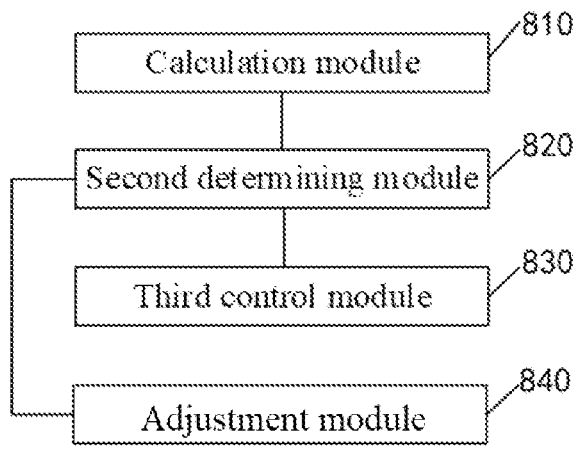
FIG. 9 is a schematic diagram showing a structure of another apparatus for grasping of a robot based on collision degree detection according to an embodiment of the present disclosure.

In an embodiment of the present disclosure, the target pose includes a position and a posture of the clamping device, the posture includes a grasping orientation at which the clamping device faces the object, and on the basis of an embodiment illustrated in FIG. 8, the apparatus further includes an adjustment module 840, as illustrated in FIG. 9.

The adjustment module 840 is configured to, subsequent to determining from all the grasping poses, by the second determining module 820, the target pose with the minimum degree of transformation relative to the current pose of the robot, adjust the grasping orientation based on a deformability of the clamping device to reduce a difference between the grasping orientation and a current orientation of the clamping device.

Here, it should be noted that the above explanation of the embodiments of the method for the grasping of the robot based on the collision degree detection is also applicable to the apparatus for the grasping of the robot based on the collision degree detection according to this embodiment, and details thereof will be omitted here.

With the apparatus for the grasping of the robot based on the collision degree detection according to the embodiments of the present disclosure, when the robot grasps the object to be grasped, all the grasping poses of the robot for grasping the object are calculated based on the clamping device at the operation terminal of the robot and the object to be grasped, the target pose with the minimum degree of transformation relative to the current pose of the robot is determined from all the grasping poses based on the first symmetry degree of the object and the second symmetry degree of the set of contact points between the clamping device and the object; and the collision degree detection is performed on the clamping device to determine the moving path from the current pose to the target pose, and the trajectory points obtained by discretizing the moving path are transmitted to the robot to complete the grasping operation. Consequently, a grasping path of the robot is planned based on the collision degree detection, such that the robot can smoothly grasp the object based on the obtained grasping path while avoiding collisions, thereby further improving the intellectualization of the robot.

Figure 10:
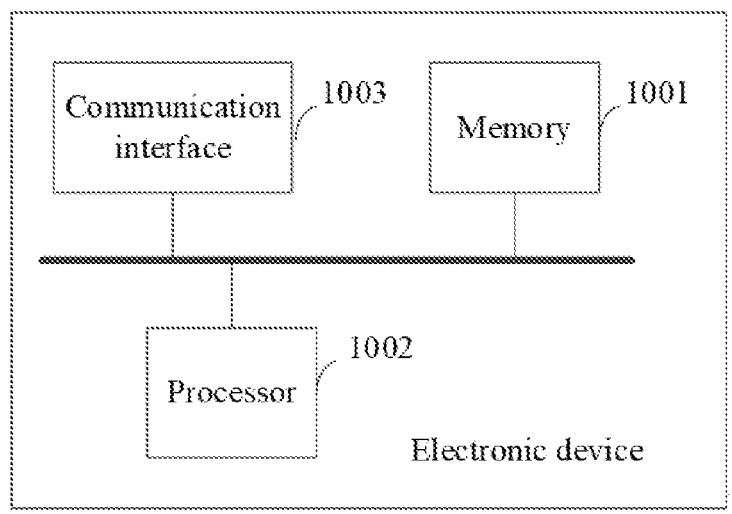
FIG. 10 is a schematic diagram showing a structure of an electronic device according to an embodiment of the present disclosure.

FIG. 10 is a schematic diagram showing a structure of an electronic device according to an embodiment of the present disclosure. The electronic device may include a memory 1001, a processor 1002, and a computer program stored in the memory 1001 and executable on the processor 1002.

The processor 1002, when executing the computer program, implements the method for motion planning of the robot according to the above embodiments.

In an embodiment of the present disclosure, the processor 1002, when executing the computer program, implements the method for path planning of the robot based on the collision degree detection according to the above embodiments.

In an embodiment of the present disclosure, the processor 1002, when executing the computer program, implements the method for grasping of the robot based on the collision degree detection according to the above embodiments.

Further, the electronic device further includes a communication interface 1003.

The communication interface 1003 is configured for communication between the memory 1001 and the processor 1002.

The memory 1001 has a computer program executable on the processor 1002 stored thereon.

The memory 1001 may include a high-speed Random Access Memory (RAM) memory, and may also include a non-volatile memory, e.g., at least one magnetic disk memory.

The processor 1002, when executing the computer program, implements the method for motion planning of the robot, the method for path planning of the robot based on the collision degree detection, or the method for grasping of the robot based on the collision degree detection according to the above embodiments.

When the memory 1001, the processor 1002, and the communication interface 1003 are implemented independently, the communication interface 1003, the memory 1001, and the processor 1002 may be connected to and communicate with each other via a bus. The bus may be an Industry Standard Architecture (ISA) bus, a Peripheral Component Interconnect (PCI) bus, an Extended Industry Standard Architecture (EISA) bus, etc. The bus can be categorized into an address bus, a data bus, a control bus, etc. For the sake of description convenience, only one thick line is drawn in FIG. 10 to represent the bus, but this does not mean that only one bus or one type of bus is present.

Optionally, in a specific implementation, when the memory 1001, the processor 1002, and the communication interface 1003 are integrated on a single chip, the memory 1001, the processor 1002, and the communication interface 1003 can communicate with each other via internal interfaces.

The processor 1002 may be a Central Processing Unit (CPU), or an Application Specific Integrated Circuit (ASIC), or may be configured to implement one or more integrated circuits according to the embodiments of the present disclosure.

Embodiments of the present disclosure further provide a computer-readable storage medium. The computer-readable storage medium has a computer program stored thereon. The computer program, when executed by a processor, implements the method for motion planning of the robot, or the method for path planning of the robot based on the collision degree detection, or the method for grasping of the robot based on the collision degree detection, as described above.

In the description of the present disclosure, it can be appreciated that terms such as "first" and "second" are used herein for purposes of description only and are not intended to indicate or imply relative importance, or implicitly indicate the number of technical features indicated. Thus, the feature defined with "first" and "second" may explicitly or implicitly include one or more of the features. In the description of the present disclosure, "a plurality of" means at least two, for example, two or three, unless specified otherwise.

In the description of the specification, description with reference to a term "an embodiment," "some embodiments," "an example," "a specific example," or "some examples" means that a particular feature, structure, material, or characteristic described in connection with the embodiment or example is included in at least one embodiment or example of the present disclosure. The illustrative expressions of the above terms in this specification are not necessarily referring to the same embodiment or example. Furthermore, the particular features, structures, materials, or characteristics described may be combined in any suitable manner in one or more embodiments or examples. In addition, different embodiments or examples and features of different embodiments or examples described in the specification may be combined by those skilled in the art without mutual contradiction.

Description of any process or method described in a flow chart or described herein in other ways may be understood to represent a module, segment or part including codes of one or more executable instructions for achieving specific logical functions or steps in the process, and the scope of preferred embodiments of the present disclosure includes additional implementations, which may be executed in a different order from the illustrated or discussed order, including a substantially simultaneous order or reverse order, depending on functions involved, which should be understood by those skilled in the art of the embodiments of the present disclosure.

The logics and/or steps represented in the flowchart or described otherwise herein can be for example considered as a list of ordered executable instructions for implementing logic functions, and can be embodied in any computer-readable medium that is to be used by or used with an instruction execution system, apparatus, or device (such as a computer-based system, a system including a processor, or any other system that can extract and execute instructions from an instruction execution system, apparatus, or device). For the present disclosure, a "computer-readable medium" can be any apparatus that can contain, store, communicate, propagate, or transmit a program to be used by or used with an instruction execution system, apparatus, or device. More specific examples of computer-readable mediums include as a non-exhaustive list: an electrical connector (electronic device) with one or more wirings, a portable computer disk case (magnetic devices), a Random Access Memory (RAM), a Read Only Memory (ROM), an Erasable Programmable Read Only Memory (EPROM or flash memory), a fiber optic device, and a portable Compact Disk Read Only memory (CDROM). In addition, the computer-readable medium may even be paper or other suitable medium on which the program can be printed, as the program can be obtained electronically, e.g., by optically scanning the paper or the other medium, and then editing, interpreting, or otherwise processing the scanning result when necessary, and then storing it in a computer memory.

It should be understood that various parts of the present disclosure may be realized by hardware, software, firmware or a combination thereof. In the above embodiments, a plurality of steps or methods may be realized by the software or firmware stored in the memory and executed by an appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a Programmable Gate Array (PGA), a Field Programmable Gate Array (FPGA), etc.

It can be understood by those skilled in the art that all or a part of the steps of the method according to the above embodiments may be implemented by relevant hardware instructed by a program. The program may be stored in a computer-readable storage medium. The program, when executed, implements one or a combination of the steps of the method according to the above embodiments.

In addition, individual functional units in the embodiments of the present disclosure may be integrated in one processing module or may be separately and physically present, or two or more units may be integrated in one module. The integrated module as described above may be implemented in a form of hardware or in a form of a software functional module. If the integrated module is implemented in the form of a software functional module and sold or used as a separate product, the integrated module may be stored in a computer-readable storage medium.

The storage medium mentioned above may be a read-only memory, a magnetic disk or a CD, etc. Although the embodiments of the present disclosure have been illustrated and described above, it is to be appreciated that the above embodiments are exemplary, and cannot be construed as limiting the present disclosure. Those skilled in the art may make changes, modifications, substitutions, and variations to the above embodiments within the scope of the present disclosure.

What is claimed is:

1. A method for motion planning of a robot, characterized in performing collision degree detection on an object, the method comprising:
  loading a space model of a real scene where the object is located;
  performing collision detection on the object and each of at least one collision subject in the space model; and
  determining a motion planning scheme for the robot corresponding to a result of the collision detection based on a collision sensitivity of the object and a collision sensitivity of each of the at least one collision subject, the motion planning scheme being formed by the robot operating on the object, wherein the robot is configured to move based on the determined motion planning scheme when operating the object, wherein said performing the collision detection on the object and each of the at least one collision subject in the space model comprises:

determining a degree of overlap between a collision model of the object and a subject model of the collision subject; and determining a collision degree of the collision subject based on the degree of overlap and resolutions of the collision model and the subject model in the space model, wherein the collision model comprises a set of cubes formed by dividing a space occupied by the object at a first resolution in the space model, and the subject model comprises a set of cubes formed by dividing a space occupied by the collision subject at a second resolution in the space model, and wherein said determining the collision degree of the collision subject based on the degree of overlap and the resolutions of the collision model and the subject model in the space model comprises:

determining a set of overlapping cubes between the collision model and the subject model; and determining a depth weight of each cube in the set of overlapping cubes based on distances between the cube and corresponding surfaces of the models, and determining a collision degree between the collision model and the subject model based on the depth weight and the degree of overlap, wherein the degree of overlap is a number of cubes in the set of overlapping cubes.

2. The method according to claim 1, wherein the at least one collision subject comprises a plurality of subjects overlapping a space occupied by the object on respective moving paths, after the robot completes a grasping operation on the object and before a placement operation on the object, in the motion planning scheme; and/or the at least one collision subject comprises a clamping device at an operation terminal of the robot during the grasping operation on the object; and/or the at least one collision subject comprises a contact object with which the object is in contact when being placed by the robot during the placement operation.

3. An electronic device, comprising:

a memory;

a processor; and a computer program stored in the memory and executable on the processor, wherein the processor, when executing the computer program, implements the method for the motion planning of the robot according to claim 1.

4. An electronic device, comprising:

a memory;

a processor; and a computer program stored in the memory and executable on the processor, wherein the processor, when executing the computer program, implements the method for the path planning of the robot based on the collision degree detection according to claim 1.

5. A computer-readable storage medium, having a computer program stored thereon, wherein the computer program, when executed by a processor, implements the method for the motion planning of the robot according to claim 1.

6. A method for path planning of a robot based on collision degree detection, the method comprising:

when the robot completes a grasping operation on an object, performing moving path planning on the robot based on the collision degree detection, discretizing a moving path corresponding to a result of the moving path planning, and transmitting discretized trajectory points obtained by the discretizing for the robot to move, wherein the collision degree detection is performed adopting the method for motion planning of the robot according to claim 1;

determining a moving time point of the robot corresponding to each of the discretized trajectory points based on a moving speed of the robot, and performing collision detection on the object at the moving time point; and stopping moving of the robot at a time point when a collision degree is higher than a collision sensitivity of the object, to prevent an occurrence of danger.

7. The method according to claim 6, wherein said performing the collision detection on the object at the moving time point comprises: performing the collision detection, at the moving time point, on the object and a collision subject in a space model of a real scene where the object is located, wherein the space model corresponds to a situation of the real scene at the moving time point, and wherein the method further comprises: stopping moving of the robot at a time point when the collision degree is higher than a collision sensitivity of the collision subject, to prevent an occurrence of danger.

8. A computer-readable storage medium, having a computer program stored thereon, wherein the computer program, when executed by a processor, implements the method for the path planning of the robot based on the collision degree detection according to claim 6.

\* \* \* \* \*